Figure 1:
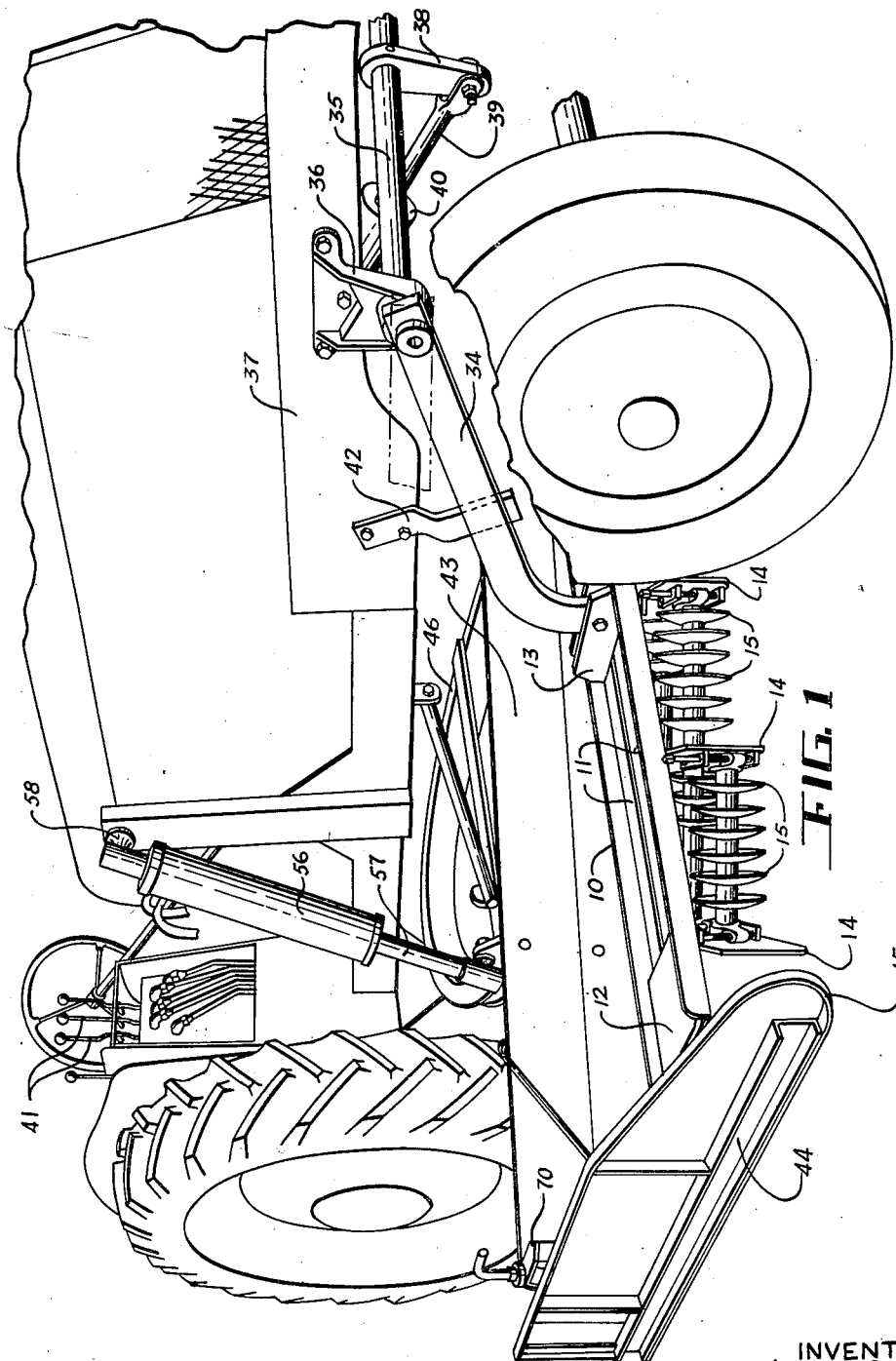

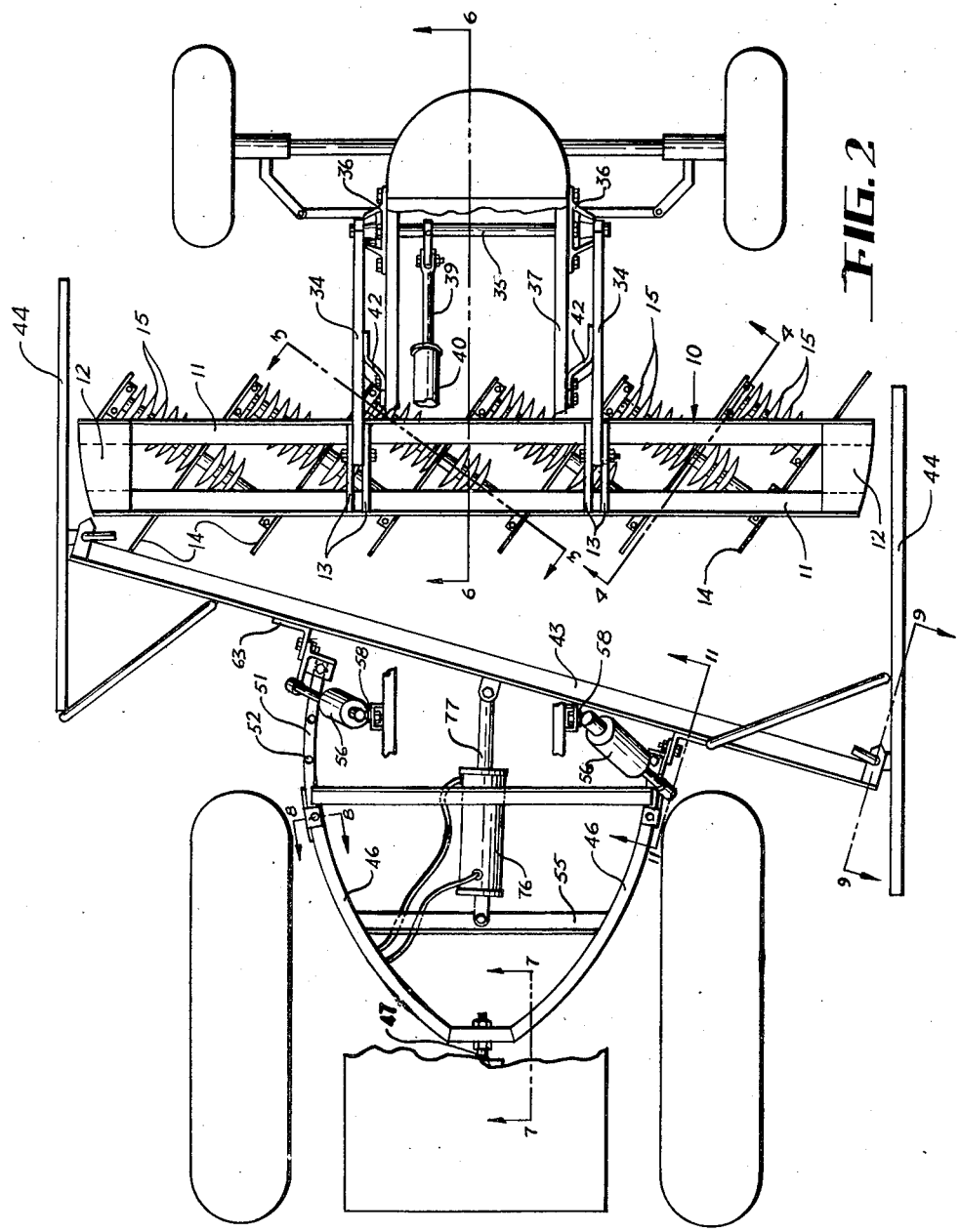

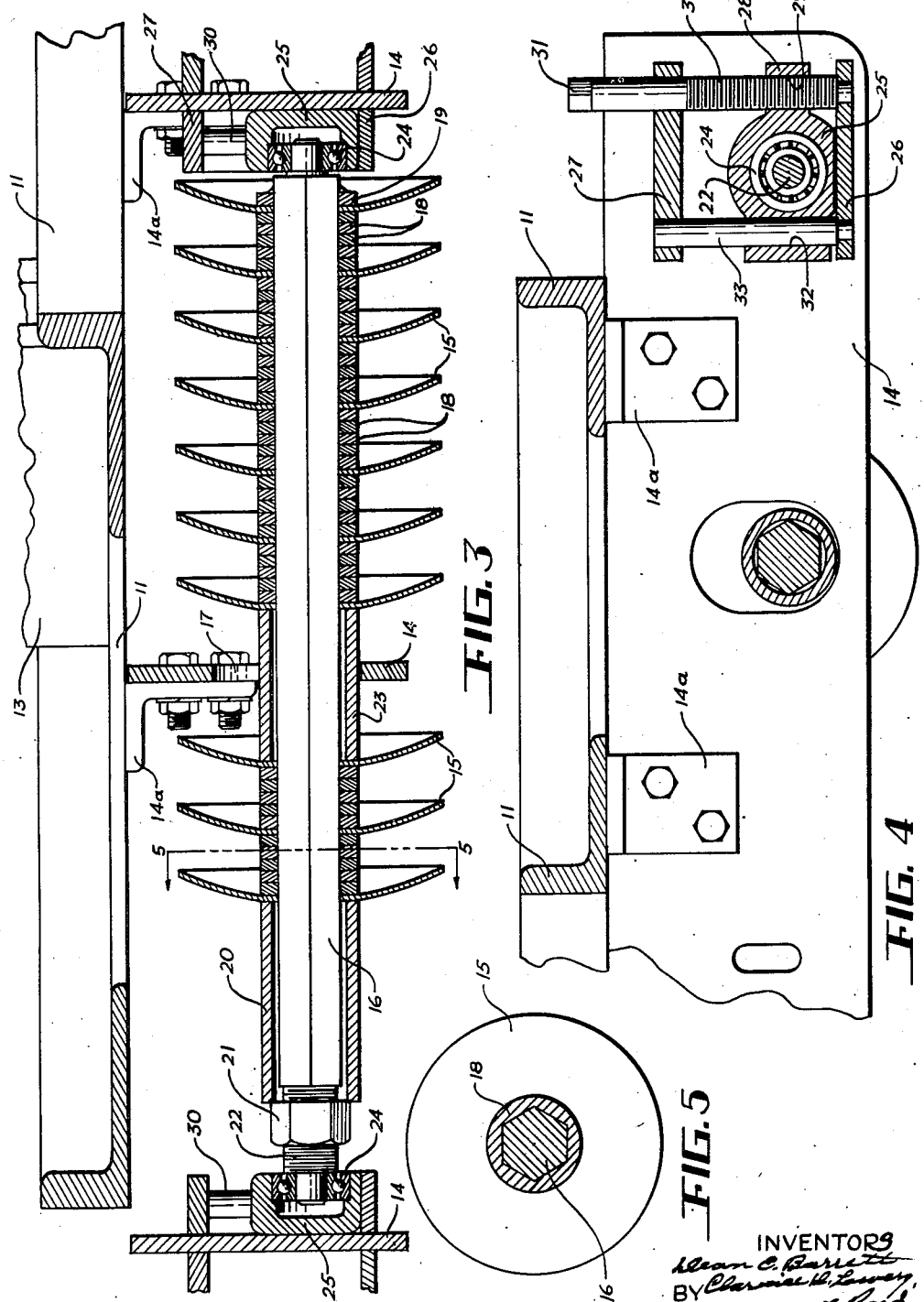

Sept. 23, 1952  D. E. BARRETT ET AL  2,611,196
MULCHING AND GRADING APPARATUS
Filed Jan. 30, 1946  4 Sheets-Sheet 4
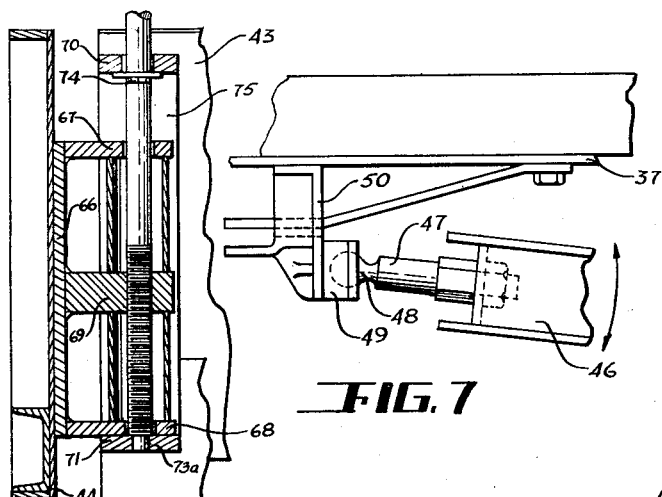
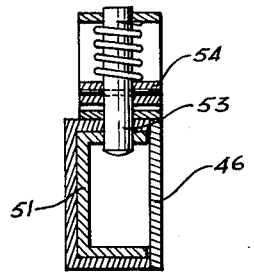
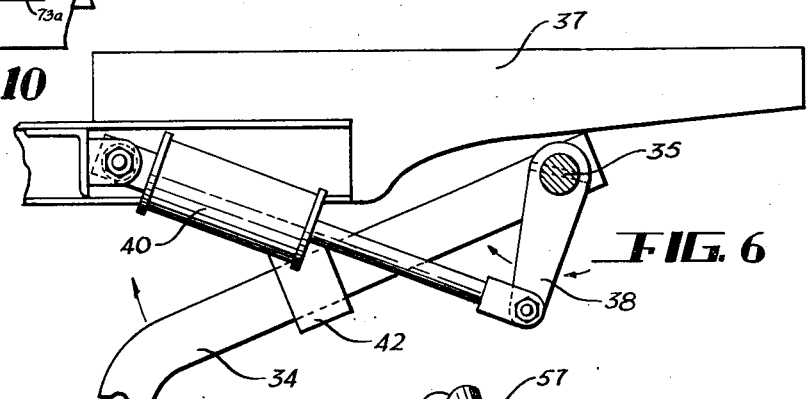
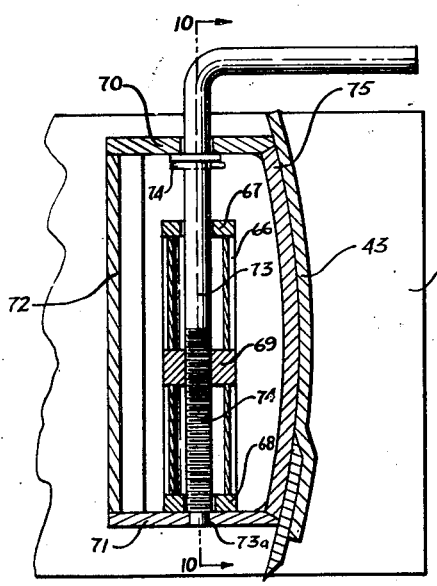
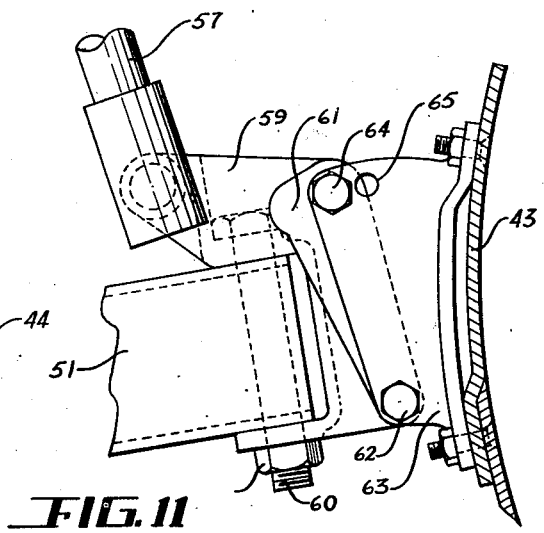

Patented Sept. 23, 1952

2,611,196

UNITED STATES PATENT OFFICE 2,611,196

MULCHING AND GRADING APPARATUS

Dean E. Barrett and Clarence D. Lowery, Marion, Ohio, assignors to The Huber Manufacturing Company, Marion, Ohio, a corporation of Ohio Application January 30, 1946, Serial No. 644,282

11 Claims. (Cl. 37—145)

This invention relates to a mulching and grading apparatus and is designed for mulching and leveling surfaces for various purposes, such as preparing golf courses, lawns, and the like for seeding, and for the conditioning of race courses.

One object of the invention is to provide an apparatus which will loosen the soil to the desired depth and spread the loosened soil to provide a smooth level surface.

A further object of the invention is to provide such an apparatus which is adjustable to vary the depth to which the soil is loosened and to vary the height of the finished surface.

A further object of the invention is to provide such an apparatus with which the soil may be loosened, the loosened soil moved from the high points to the low points of the ground surface and excess soil spread to provide a smooth level surface.

A further object of the invention is to provide such an apparatus which can be attached to and propelled by a tractor.

A further object of the invention is to provide such an apparatus in which the normal operations thereof may be controlled from an operator's station on the tractor.

Other objects of the invention may appear as the apparatus is described in detail.

In the accompanying drawings, Fig. 1 is a perspective view of a portion of a tractor showing the mulching and grading apparatus mounted beneath the same; Fig. 2 is a plan view of the grading and mulching devices, the intermediate portion of the tractor being broken away; Fig. 3 is a section taken on the line 3—3 of Fig. 2; Fig. 4 is a section taken on the line 4—4 of Fig. 2; Fig. 5 is a section taken on the line 5—5 of Fig. 3; Fig. 6 is a section taken on the line 6—6 of Fig. 2; Fig. 7 is a section taken on the line 7—7 of Fig. 2; Fig. 8 is a section taken on the line 8—8 of Fig. 2; Fig. 9 is a section taken on the line 9—9 of Fig. 2; Fig. 10 is a section taken on the line 10—10 of Fig. 9; and Fig. 11 is a section taken on the line 11—11 of Fig. 2.

In these drawings we have illustrated one embodiment of the invention and have shown the same as supported and propelled by a tractor, but it is to be understood that this particular embodiment has been chosen for the purpose of illustration and that the apparatus as a whole, as well as the various parts thereof, may take various forms and that the apparatus may be supported and propelled in various ways, without departing from the spirit of the invention.

In the embodiment here illustrated the apparatus comprises two main units, a soil loosening and leveling unit and a spreader arranged in the rear of the soil loosening and leveilng unit. The soil loosening and leveling unit comprises an elongate relatively narrow frame 10 which is adapted to extend beneath and transversely to the frame of a tractor and to be moved by the tractor in a direction transverse to its length. In the arrangement shown the frame 10 comprises two substantially parallel angle bars 11 spaced laterally one from the other and rigidly connected one with the other at their ends by plates 12 and also connected by brackets 13. A plurality of scrapers 14 are rigidly secured to and depend from the frame 10 and are arranged obliquely to that frame so as to provide a laterally inclined soil engaging surface. The scrapers may be connected with the frame in any suitable manner, and, as here shown, angle brackets 14a are rigidly secured to the lower sides of the frame members 11 and to the scrapers.

Also supported by the frame 10 are a plurality of groups of soil loosening devices 15 which are arranged to enter the soil in advance of the respective scrapers 14 to loosen or plow the same and to break the loosened soil into relatively small pieces. Preferably the soil loosening devices of each group are arranged between adjacent scrapers and are spaced apart in a line at approximately right angles to the scrapers. In the construction shown the soil loosening devices are in the nature of concavo-convex disks and the disks of the respective groups are mounted on shafts 16, each of which is rotatably supported by the frame members 11 and is preferably supported directly on the scrapers 14. Each shaft is arranged between and supported by two scrapers and, with the exception of one group of disks, the shafts are of a length equal to the combined distances between three scrapers and each shaft is supported at its ends on the first and third scrapers and extends through a slot 17 in the second or intermediate scraper, as best shown in Fig. 3. The disks are rigidly secured to the shaft for rotation therewith and in the present instance the shaft is non-circular in cross section and the disks are provided with correspondingly shaped openings in which the shaft fits snugly. The disks are spaced apart lengthwise of the shaft and are rigidly held against axial movement, so that they rotate with the shaft in fixed relation one to the other. Any suitable means may be provided to secure the disks in their spaced positions but we prefer to interpose between adjacent disks a plurality of spacing elements or collars 18 which are movable lengthwise of the shaft. Rigidly secured to the shaft on the outer side of the end disk, at one end of the shaft, is a collar 19 against which said end disk abuts and mounted about the other end portion of the shaft is a sleeve 20 which engages the outer surface of the end disk at that end of the shaft. The outer end of the sleeve is engaged by a nut 21 mounted on the screw threaded portion 22 of the shaft so that the tightening of the nut will cause the sleeve to press the disks and the spacing members lengthwise of the shaft and to tightly clamp the disks between the collars and the sleeve. It is preferable, but not necessary, that a sleeve 23 instead of a plurality of spacing elements, shall be interposed between the disks 15 adjacent the opposite sides of the intermediate scraper.

Each shaft 16 may be rotatably supported on the two scrapers in any suitable manner but preferably the shaft is mounted in vertically adjustable bearings so that the lower edges of the disks may be caused to extend variable distances below the scrapers. In the arrangement shown, each shaft has reduced end portions rotatably mounted in ball bearings 24 which are rigidly mounted in bearing supports 25. Each bearing support is arranged between vertically spaced brackets or lugs 26 and 27 which project laterally from the scraper. The bearing support is provided on one side of the shaft with a lug 28 having a screw threaded aperture 29 through which extends the threaded portion of a screw 30 which is rotatably mounted in the brackets 26 and 27 and is provided at its upper end with a non-circular portion 31 adapted to receive a wrench or other implement by which the screw may be rotated to impart vertical movement to the bearing support and shaft. On the other side of the shaft the bearing support is provided with a smooth vertical bore 32 through which extends a pin 33 mounted at its ends in the brackets 26 and 27 and which constitutes a guide for the bearing block to hold the same against pivotal or tilting movement about either a horizontal axis or a vertical axis.

The soil loosening and leveling unit may be connected with the tractor in any suitable manner and in the present instance arms 34 are pivotally connected with the respective brackets 13, extend upwardly and forwardly therefrom and are rigidly secured to a transverse shaft 35 carried by the tractor and in the present instance rotatably mounted in bearing brackets 36 mounted on the tractor frame 37. Rigidly connected with the shaft 35 is a crank arm 38 which is pivotally connected with the piston rod 39 of a fluid actuated device of the cylinder and piston type which is mounted on the tractor as shown at 40. Fluid under pressure, usually oil, may be delivered to the cylinder and controlled in the usual manner or any suitable manner. Inasmuch as the fluid operated mechanism and controls are conventional in type they are not illustrated or described except to note that the flow of fluid to and from the cylinder is controlled by one of a plurality of levers 41 mounted adjacent the operator's station at the rear end of the tractor, so that the operator can, from his station, cause the soil loosening and leveling unit to be raised or lowered and the desired pressure exerted thereon. Arms 42 are rigidly secured to the frame of the tractor and extend across the inner sides of the arms 34 so as to brace those arms against lateral deflection due to longitudinal stresses exerted on the frame 10.

It will be apparent, therefore, that the soil loosening and leveling unit is supported and propelled by the tractor and that, as the unit is moved forwardly transversely to the length of the frame, the disks move through the soil at an angle to the line of movement of the unit and thus loosen the soil and break up or granulate the same. As the unit is advanced the scrapers level the loosened soil, that is, they move the high portions thereof into the low places in the surface and due to their oblique positions with relation to the line of movement of the unit they cause the excess oil to be displaced laterally and to be passed by the scrapers. The depth to which the soil is loosened is controlled both by the vertical adjustment of the soil loosening devices with relation to the scrapers and by the downward pressure exerted on the unit.

Arranged in the rear of the soil loosening and leveling unit is a spreader which is adapted to spread the loosened soil which has been laterally displaced and passed by the scrapers and to impart to the loosened soil a smooth level surface. The spreader as here shown comprises an elongate blade 43 supported edgewise and extending beneath the frame of the tractor and beyond the opposite sides of the latter. This blade is supported at its respective ends by spreader boards 44 which are provided with ground engaging runners 45 and which are of such length that they overlap the respective ends of the soil loosening and leveling unit. The blade may be supported and propelled by the tractor in various ways but it is preferably mounted for vertical adjustment so as to vary the height or level of the finished surface formed by the blade. In the construction here shown the blade is supported by two rearwardly converging arms 46 rigidly connected at their rear ends one with the other and with a forwardly extending stud 47. The stud has at its rear end a spherical bearing member 48 which extends into a spherical socket in a bearing member 49 which is rigidly secured to a bracket 50 carried by the frame 37 of the tractor. The arms 46 are preferably adjustable in length so that by an adjustment of the arms the spreader blade 43 may be supported in different angular positions with relation to the soil loosening and scraper unit. For this purpose the arms have forward portions 51 which can be adjusted lengthwise of the main portions of the arms. As best shown in Fig. 8 the rear portions of the arms 46 are hollow and approximately rectangular in cross section and the extensions 51 are in the nature of channel bars fitting snugly in but adjustable lengthwise with relation to the main portions of the arms. Each extension 51 is provided with a series of apertures 52 each adapted to receive a spring pressed pin 53, carried by a bracket 54 mounted on the arm 46, and extending through the top wall of the hollow portion of the arm. Thus the extensions 51 may be extended or retracted by withdrawing the pins 53, adjusting the extensions and causing the pins to enter selected holes in the respective extensions. The arms 46 are rigidly braced by cross bars 55. A fluid operated device including a cylinder 76 connected with one of the bars 55 and a piston rod 77 connected with the blade serves to adjust the angular position of the blade.

Power operated means are provided for raising and lowering the spreader and in the arrangement here shown this power operated means comprises fluid operated devices arranged on opposite sides of the tractor. Each device comprises a cylinder 56 and a piston, not shown, having a piston rod 57 connected at its lower end with the blade. The cylinder is connected with the tractor at 58 for pivotal movement to permit it to accommodate itself with relation to the movements of the spreader. The piston rod is pivotally connected at its lower end to a bracket 59 with which the extension 51 is pivotally connected, as by a bolt 60. The bracket 59 includes a downwardly extending part 61 which is connected at its lower end, by a bolt 62, with a bracket 63 rigidly secured to and extending rearwardly from the blade 43. The bracket 59 is also connected with the upper portion of the bracket 63 by a bolt 64. Preferably the bracket 63 on the blade is provided with two or more holes 65 through any one of which the bolt 64 may be inserted to vary the angular position of the blade with relation to the bracket 59. The cylinders are connected with a source of supply for fluid under pressure and the flow of fluid to the cylinders is controlled by one or more of the levers 41, in a conventional manner.

The blade 43 is vertically adjustable with relation to the spreader boards 44 and for this purpose there is rigidly secured to the inner side of each spreader board an upright structure 66 having inwardly extending members 67 and 68 and a relatively thick intermediate member 69 provided with a screw threaded aperture and constituting a nut. Rigidly secured to the blade 43 is a bracket structure comprising an upright plate 75 rigidly secured to the forward face of the blade and having forwardly extending upper and lower members 70 and 71 connected at their forward edges by a vertical member 72. The members 70 and 71 are spaced apart a distance greater than the height of the structure 66 carried by the spreader board and the members 67, 68, 70 and 71 are provided with alined openings through which extends a rod 73 having a screw threaded portion 74 mounted in the nut 69. The rod 73 is held against axial movement with relation to the members 70 and 71, which are secured to the blade, by a step bearing 73a and a cotter pin 74, so that the rotation of the rod in the nut 69 will impart relative vertical movement to the spreader board and the blade and thus support the lower edge of the blade at different distances from the ground level on which the spreader board rests.

Thus the spreader is caused to move forwardly at an acute angle to the line of movement of the tractor and engages the soil which has been laterally displaced by the blades and distributes such soil over the surface which is being graded to provide the latter with a smooth level surface. By adjusting the blade with relation to the spreader boards the blade may be caused to engage the surface as leveled by the scrapers to any desired depth and to redistribute the same either for the purpose of filling low spots left by the scrapers or to provide a mulched surface of a desired depth. The depth of the mulched surface is often important, as in the case of race courses where it is desirable to provide a granulated earth cushion of fixed depth.

While we have shown and described one embodiment of our invention, we wish it to be understood that we do not desire to be limited to the details thereof as various modifications may occur to a person skilled in the art.

Having now fully described our invention, what we claim as new and desire to secure by Letters Patent is:

1. In combination with a tractor, a plurality of scrapers supported beneath the frame of said tractor and extending obliquely to the line of movement of said tractor, a plurality of series of soil loosening devices supported beneath said tractor frame and extending below said scrapers, each series of loosening devices being arranged between and extending transversely to two of said scrapers, an actuating device mounted on said tractor, and means for connecting said actuating device with said scrapers and said soil loosening devices to simultaneously raise and lower the same.

2. In combination with a tractor, a soil loosening and leveling unit comprising a frame arranged beneath and extending beyond the sides of the frame of said tractor between the front and rear wheels thereof, a plurality of soil loosening devices carried by said frame and spaced apart lengthwise thereof, a plurality of scrapers carried by said frame, spaced apart lengthwise thereof and extending obliquely thereto, a shaft on said tractor frame, means for imparting rotary movement to said shaft, arms rigidly secured to said shaft and connected with said frame to raise and lower said soil loosening and leveling unit, a spreader supported beneath said tractor frame in the rear of said unit and comprising a blade extending obliquely to said tractor frame and of a length greater than the length of said loosening and leveling unit, spreader boards connected with the respective ends of said blade and extending forwardly beyond said loosening and leveling unit, means for connecting said blade with and propelling the same by said tractor frame, and power operated means for raising and lowering the said blade.

3. A soil loosening and leveling unit for a mulching and grading apparatus, comprising an elongate substantially horizontal frame adapted for movement transversely to its length, a plurality of scrapers mounted on said frame, extending obliquely to the line of movement thereof and spaced apart lengthwise of said frame, a plurality of elongate members connected with said frame and supported below the same, each elongate member being supported between two of said scrapers and extending transversely to said scrapers, and a plurality of soil loosening devices secured to each of said elongate members and extending below said scrapers.

4. A soil loosening and leveling unit for a mulching and grading apparatus, comprising an elongate substantially horizontal frame adapted for movement transversely to its length, a plurality of scrapers mounted on said frame, extending obliquely to the line of movement thereof and spaced apart lengthwise of said frame, a plurality of relatively short shafts connected with said frame and supported below the same for rotation about their longitudinal axes, each shaft extending transversely to said scrapers, and a plurality of soil loosening devices connected with each shaft for rotation therewith and spaced apart lengthwise of said shaft.

5. A soil loosening and leveling unit for a mulching and grading apparatus, comprising an elongate substantially horizontal frame adapted for movement transversely to its length, a plurality of scrapers mounted on said frame, extending obliquely to the line of movement thereof and spaced apart lengthwise of said frame, a plurality of relatively short shafts below said frame and extending transversely to said scrapers, each shaft being arranged between and being rotatably supported by two of said scrapers, and a plurality of soil loosening devices mounted on each shaft for rotation therewith and spaced apart lengthwise thereof.

6. A soil loosening and leveling unit for a mulching and grading apparatus, comprising an elongate substantially horizontal frame adapted for movement transversely to its length, a plurality of scrapers mounted on said frame, extending obliquely to the line of movement thereof and spaced apart lengthwise of said frame, a plurality of relatively short shafts connected with said frame and supported below the same for rotation about their longitudinal axes, each shaft extending transversely to said scrapers, a plurality of soil loosening devices connected with each shaft for rotation therewith and spaced apart lengthwise of said shaft, and means for vertically adjusting said shafts with relation to said frame.

7. A soil loosening and leveling unit for a mulching and grading apparatus, comprising an elongate substantially horizontal frame adapted for movement transversely to its length, a plurality of scrapers mounted on said frame, extending obliquely to the line of movement thereof and spaced apart lengthwise of said frame, a plurality of relatively short shafts below said frame and extending transversely to said scrapers, each succeeding shaft extending beyond the preceding shaft, bearings carried by said scrapers, each shaft being mounted at its ends in bearings on two of said scrapers, and a plurality of soil loosening devices secured to and spaced apart lengthwise of each shaft.

8. A soil loosening and leveling unit for a mulching and grading apparatus, comprising an elongate substantially horizontal frame adapted for movement transversely to its length, a plurality of scrapers mounted on said frame, extending obliquely to the line of movement thereof and spaced apart lengthwise of said frame, a plurality of relatively short shafts below said frame and extending transversely to said scrapers, each succeeding shaft extending beyond the preceding shaft, bearings carried by said scrapers, each shaft being mounted at its ends in bearings on two of said scrapers, a plurality of soil loosening devices secured to and spaced apart lengthwise of each shaft, and means for vertically adjusting said bearings with relation to said scrapers.

9. In a soil grading apparatus, an elongate soil loosening and leveling unit having means whereby it may be connected with a propelling mechanism for movement thereby transversely to its length, said unit comprising a plurality of parallel groups of soil loosening elements spaced apart lengthwise of said unit, the elements of each group being substantially in a line oblique to the line of movement of said unit, and substantially parallel scrapers supported between groups of said loosening elements and extending transversely thereto from points adjacent the forward ends of said elements rearwardly beyond said groups, the rear end of each scraper being at the rear of and spaced from one of said groups.

10. In a soil grading apparatus, an elongate soil loosening and leveling unit having means whereby it may be connected with a propelling mechanism for movement thereby transversely to its length, said unit comprising a plurality of substantially parallel series of soil loosening discs, the discs of each series being in a line oblique to the line of movement of said unit, and a plurality of scrapers spaced apart lengthwise of said unit, each scraper extending from a point adjacent the foremost disc of one series of discs across the rear portion of an adjacent series of discs to a point in the rear of and substantially in line with the foremost disc of the last mentioned series.

11. In a soil grading apparatus, a supporting structure movable over the soil which is to be graded, an elongate soil loosening and leveling unit extending transversely to the line of movement of said supporting structure and connected therewith for movement thereby, said unit including a plurality of devices spaced apart lengthwise thereof and arranged to move through and loosen the soil when said supporting structure moves forwardly, said unit also including scrapers supported between and in normally fixed relation to adjacent soil loosening devices and extending rearwardly beyond said devices to level the soil loosened by said devices and move the excess soil laterally in the rear of said soil loosening devices, means for adjusting said soil loosening devices with relation to said scrapers, and means on said supporting structure and connected with said soil loosening and leveling unit for raising and lowering said unit with relation to said structure.

DEAN E. BARRETT.
CLARENCE D. LOWERY.

REFERENCES CITED

The following references are of record in the file of this patent:

UNITED STATES PATENTS

| Number | Name | Date |
|---|---|---|
| 493,124 | Scott | Mar. 7, 1893 |
| 555,760 | Cobb | Mar. 3, 1896 |
| 657,374 | Williams | Sept. 4, 1900 |
| 816,085 | Foote | Mar. 27, 1906 |
| 975,457 | Ransome | Nov. 15, 1910 |
| 983,493 | Hendren | Feb. 7, 1911 |
| 1,244,505 | Kincaid | Oct. 30, 1917 |
| 1,330,531 | Haynes | Feb. 10, 1920 |
| 1,425,303 | Welsh | Aug. 8, 1922 |
| 1,758,491 | Aitken | May 13, 1930 |
| 1,811,490 | Brown | June 23, 1931 |
| 1,817,999 | Michalka | Aug. 11, 1931 |
| 2,006,384 | Burgess | July 2, 1935 |
| 2,067,168 | Baumgardner | Jan. 12, 1937 |
| 2,197,549 | Hargrave et al. | Apr. 16, 1940 |